June 9, 1936.  R. H. MÜLLER  2,043,589
PHOTOELECTRIC COLORIMETER
Filed May 31, 1933
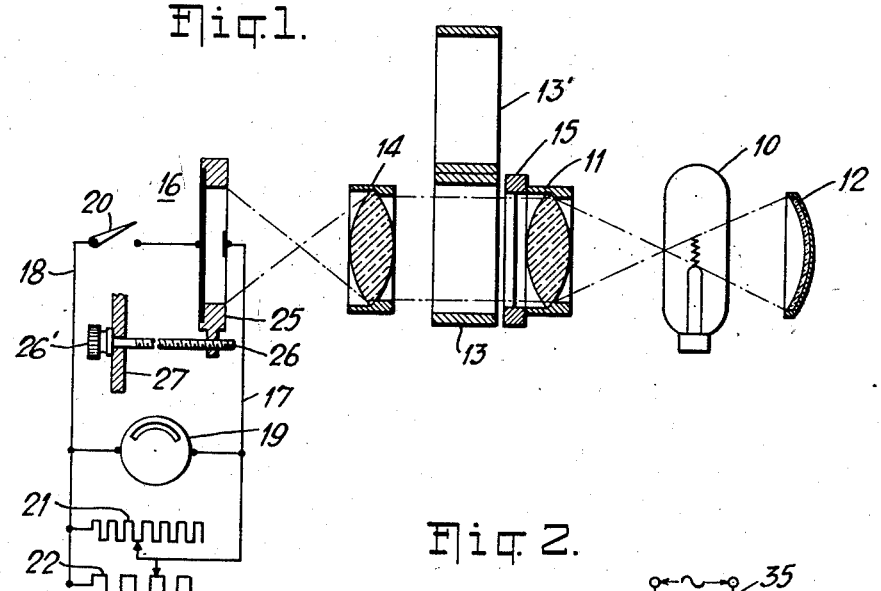
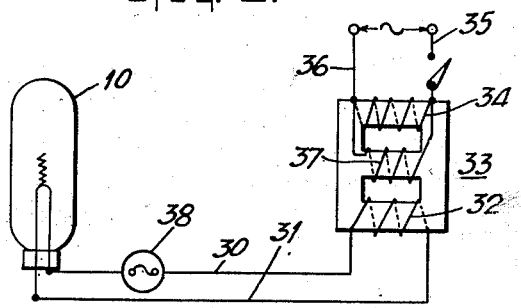
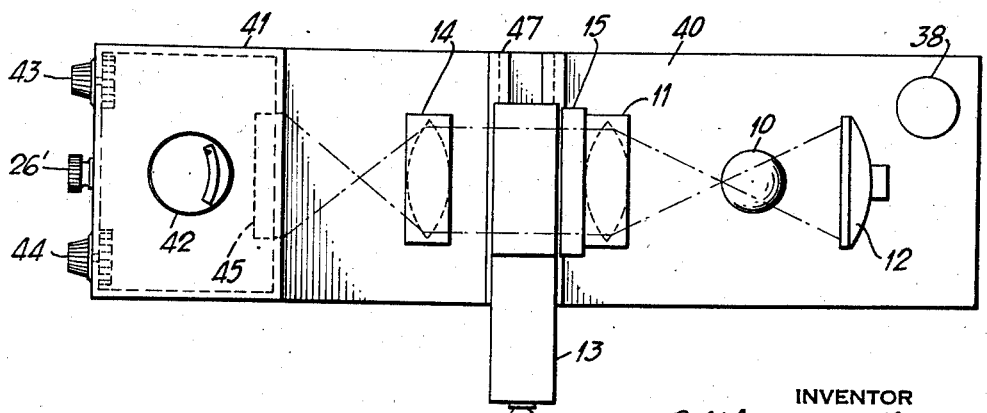
INVENTOR
Ralph H. Müller
BY
Watson, Bristol, Johnson & Leavenworth
ATTORNEYS Patented June 9, 1936

2,043,589

UNITED STATES PATENT OFFICE 2,043,589

PHOTOELECTRIC COLORIMETER

Ralph H. Müller, Brooklyn, N. Y.

Application May 31, 1933, Serial No. 673,606

5 Claims. (Cl. 88—14)

This invention relates to photoelectric colorimeters and particularly to colorimeters adapted to measure or compare light transmitted by a translucent body.

The invention has for its object generally to provide an apparatus of the character indicated which is efficient, economical and is readily constructed of simple and rugged parts.

More specifically, it is an object to provide light measuring apparatus which gives electrical indications directly responsive to the light or color effects to be measured and can be arranged to give determined values in terms either relatively or with reference to a standard.

It is a further object to provide apparatus having an optical system and a light actuated electrical system cooperatively arranged for determining quickly in the manner indicated the amount of light of one or more colors which can be transmitted by translucent bodies such as solutions. This light transmission characteristic is hereinafter referred to as the "transmittancy" of the body or solution.

Other objects of the invention will in part be obvious and will in part appear hereinafter.

The invention accordingly comprises the features of construction, combination of elements, and arrangement of parts, which will be exemplified in the construction hereinafter set forth and the scope of the invention of which will be indicated in the claims.

For a fuller understanding of the nature and objects of the invention reference should be had to the following detailed description taken in connection with the accompanying drawing, in which:

Fig. 1 is a schematic diagram illustrating an optical system and a light actuated electric system cooperatively arranged for determining the transmittancy of translucent bodies in accordance with the invention;

Fig. 2 is a view mainly schematic showing the system for maintaining the light source constant in the optical system shown in Fig. 1;

Fig. 3 is a plan view of apparatus incorporating an optical system and an electrical system of the present invention on a single base to provide a unitary commercial instrument in accordance with the invention; and Fig. 4 is a fragmentary view showing a detail of construction.

Referring now to the drawing, and particularly to Fig. 1, 10 denotes a source of illumination for the optical system of the present invention. This source may be of any convenient form which has a substantially constant intensity of illumination, for example, an electric incandescent lamp having a concentrated tungsten filament of the character commonly used in projection lamps. The light emanating from such a source is seen to radiate from a relatively small area and for practical purposes may be regarded as equivalent to a point source of radiation which supplies light having a spherical wave front. Associated with the source of illumination are light collecting and transmitting means. A simple refracting means, for example a lens as shown at 11, may be used for this purpose, although it is preferred to employ both refracting and reflecting means. Accordingly, there is shown in addition a spherical mirror 12 placed on the opposite side of the light source from the lens 11. By this arrangement, light of increased intensity is collected by the lens 11 and transmitted as a beam of parallel light, which is employed for the purpose of determining the color density or transmittancy of the body to be examined. For this purpose, there is shown as interposed in the path of the beam a body supporting means 13. Where the body to be examined is a solution, this means advantageously has the form of a cell with parallel transparent walls which are adapted to be traversed transversely by the parallel beam. A second refracting means or lens 14 is arranged in the path of the beam as it leaves the body in the supporting means 13. This second lens is arranged to convert the beam of parallel light into a beam having a divergent characteristic. It is preferred that the beam be a rapidly diverging one. Hence, the lens 14 is shown as of the double convex type, the light traversing the same being first brought to a focus, after which it rapidly diverges. The light transmitted for examination purposes may be either a mixture of colors such as is normally found in so-called white light radiated from incandescent lamps, or a selected band of colors or wave lengths, which may be transmitted and employed for examination purposes. To this end, there is shown as interposed between the lens 11 and supporting means 13 a light filter 15. This filter may conveniently be in the form of a translucent colored screen, one or more of which may be employed in conjunction with a commercial instrument. Also, there is preferably associated with the body supporting means 13 a second portion or cell 13' which may hold another body to be examined, which second body may be either another translucent body whose transmittancy is to be determined, or a standard body with which comparison is to be made.

The electrical system which cooperates with the optical system of the present invention has a light sensitive element positioned in a portion of the divergent rays in a manner such as to give quick response to any change in the light transmitted. Accordingly, a light sensitive element 16 is shown as movably positioned in a portion of the divergent beam which lies substantially in the optical axis of the system. The light sensitive element here shown is of the so-called "barrier layer" variety in which the photoelectric effect is substantially directly proportional to the light intensity and is inherently capable of passing primary photoelectric current without the aid of external sources of electromotive force. As the magnitude of the current thus photoelectrically generated is proportional to the surface of the element exposed to light, the element 16 is preferably one exposing a relatively large amount of surface. The surface thus provided may be achieved in any convenient manner, for example, by the employment of one or more photo-sensitive cells having cuprous oxide on copper, such cells in general having a facing of a transparent metal film. Electrical connections lead from the metal facing and the copper backing directly to current indicating means without the interposition of batteries or the like. Conductors 17 and 18 are here shown as leading from the cell 16 to a suitable galvanometer 19, for example a micro-ammeter, a control switch 20 being preferably interposed. Also, there is preferably associated with the galvanometer 19 a regulating means which may comprise one or more portions of shunt resistance. Here two portions are shown at 21 and 22 respectively. These resistances are indicated as of the variable type and can be regulated independently, one adapted to give close adjustment for a movement of the regulating tap, whereas the second gives coarse variations for the purpose of quick adjustment.

For the purpose of adjusting the position of the element 16 in the divergent beam transmitted from lens 14, a carrier 25 is provided for the element 16 which is moved by a screw 26 working in an abutment 27; the latter being preferably secured to the same base that carries the members of the optical system.

Where the source of illumination is an incandescent lamp having a concentrated tungsten filament, it is preferable to associate current regulating means in its electric supply circuit, in order to insure the substantial constancy of the source of illumination while the optical system is in operation, and also to prevent excessive starting currents when the lamp is turned on. A convenient arrangement for this purpose is shown in Fig. 2. Here the incandescent lamp 10 is shown as supplied with current from conductors 30 and 31 leading from a commercial source of alternating current, for example, the low voltage secondary 32 of a constant current transformer 33, which operates on the saturation principle, this transformer having a primary 34 supplied with current from mains 35 and 36, there being a regulating winding 37 interposed between the primary and the secondary. While the desired regulation may be effected with a constant current transformer of the character indicated, it may also be effected by means of a ballast lamp as shown at 38 interposed in the supply conductor 30. Such ballast lamp may be used either alone, where direct current is employed or, if desired, in conjunction with the supply transformer, where alternating currents are employed.

The optical system and the electrical system provided in accordance with the invention are, in commercial practice, advantageously mounted on a single base, in order to provide a unitary instrument for conveniently determining the transmittancy of translucent bodies when desired. A single base of this character is shown at 40 in Fig. 3, on one end of which a casing 41 is mounted to house the members of the electrical system. Here a galvanometer is shown at 42 on the top of the casing and has knobs 43 and 44 for moving the taps on the resistance portions 21 and 22. A screw-head for moving the photoelectric element is shown at 26', the position of the element being indicated by broken lines at 45. The members of the optical system are shown in the same relative position as in Fig. 1, and are denoted by the same reference characters. The ballast lamp 38 in this arrangement is also conveniently mounted on the base 40.

The body supporting means 13 is here shown as having duplicate portions and is arranged to be slid back and forth across the base 40 so that first one portion and then the other may be in the beam of parallel light. A detail of mechanical construction whereby a movable frame of this character may be provided on the base 40 is shown in Fig. 4. Here, the frame carries a transparent cell 13'' and has a downwardly projecting portion 46 which has horizontal grooves along its side with which the tongues of a holding member 47 engage, the holding member being made fast to the base 40, and preferably abuts against conveniently disposed stops (not shown in the interests of clearness in the drawing).

In operation, the light source 10 is illuminated, a suitable filter at 15 inserted when desired, the body whose transmittancy is to be determined placed in the frame 13 and then moved into the path of the parallel beam extending between the lenses 11 and 14. Where the transmittancy of a solution is to be determined, it is placed in the cell shown at 13'' and the frame moved into position. The divergent light impinging upon the photoelectric element causes current to pass in the galvanometer when the switch 20 is closed. This current may be noted and then a determination of the effect of the same illumination for a calibrated standard in the frame 13 observed. In this manner, the transmittancy of bodies for light of particular colors or wave lengths may be compared. If it is desired to make the comparison in terms of a desired standard, the apparatus of the present invention is first calibrated by noting the meter readings for the transmittancy of the standard to light of various colors, after which the meter readings for a body to be examined may be had and the indications noted.

It will be seen that the light sensitive element may be subject to photoelectric effects of wide variation in making readings in this manner. By the arrangement shown, however, adjustments may be made both by positioning the light-sensitive element in a desired portion of the divergent beam by means of the screw 26 and the current passing through the galvanometer regulated by means of the shunt resistance. In this manner, the current may be kept within convenient bounds at all times. In such cases, the calibration of the instrument would necessarily specify the position of the light-sensitive element and the values of the shunt resistance associated with the standard of transmittancy for each wave length or color of light.

Since certain changes may be made in the above construction and different embodiments of the invention could be made without departing from the scope thereof; it is intended that all matter contained in the above description or shown in the accompanying drawing shall be interpreted as illustrative and not in a limiting sense.

Having described my invention, what I claim as new and desire to secure by Letters Patent, is:

1. In apparatus for determining the transmittancy of translucent bodies, the combination comprising an optical system having a substantially constant source of visible electric illumination, light collecting means including a refractor associated with said light source and adapted to transmit the collected light as a beam of parallel light, means for interposing a translucent body to be examined in said beam, refracting means for converting said parallel beam into a divergent beam, an electric system having a barrier layer photoelectric element positioned in said divergent beam, current indicating means connected directly to said photoelectric element for indicating the current passing in said element, and adjusting means for positioning said element at various points along the optical axis in a desired portion of said divergent beam.

2. In apparatus for determining the transmittancy of translucent bodies, the combination comprising an optical system having a substantially constant source of visible electric illumination, light collecting means including a refractor associated with said light source and adapted to transmit the collected light as a beam of parallel light, means for filtering said parallel beam, means for interposing a translucent body to be examined in said filtered beam, refracting means for converting said filtered beam into a divergent beam, an electric system having a barrier layer photoelectric element positioned in said divergent beam, current indicating means directly connected to said element for indicating the current passing in said element in response to the light transmitted from said last-named refracting means, and adjusting means for positioning said element at various points along the optical axis in a desired portion of said divergent beam.

3. In apparatus for determining the transmittancy of translucent bodies, the combination comprising an optical system having an electric incandescent source of illumination provided with a concentrated filament radiating light with a substantially spherical wave front, means for insuring the substantial constancy of the current supplied to said filament, means including a refractor and reflector disposed on opposite sides of said light source and arranged to collect light of said substantially spherical wave front and transmit the same as a beam of parallel light, a source of electric current supply for said source of illumination, means for filtering said beam of parallel light, a supporting means for interposing translucent bodies one at a time in said filtered parallel beam, refracting means for converting the transmitted beam into a rapidly divergent beam, an electric system having a barrier layer photoelectric element positioned in said divergent beam, current indicating means connected directly to said element for indicating the current passing in said element in response to the photoelectric effect produced by said divergent beam, and adjusting means for positioning said element in a desired position along the optical axis with respect to said divergent beam.

4. In apparatus for determining the transmittancy of solutions, the combination with a base, of a source of illumination comprising an electric incandescent lamp having a concentrated tungsten filament, electric supply connections for said source of illumination on said base including a ballast lamp, a refractor mounted on said base on one side of said source of illumination, a reflector on said base on the other side of said source of illumination and arranged to have a common optical axis with said refractor, a filter mounted on said base so as to filter the light transmitted by said refractor, a sliding frame mounted on said base beyond said filter and adapted to support a plurality of cells holding a solution whose transmittancy is to be determined by the passage of the light transmitted by said filter, a second refractor mounted on said base so as to have an optical axis in common with said reflector and first-named refractor, said second-named refractor being constructed to produce a rapidly divergent beam of transmitted light, a casing disposed on said base beyond said second refractor and having a photoelectric element housed therein and exposed to said divergent beam, a current indicating device associated with said casing and connected directly to said photoelectric element for indicating the current passing therein, adjustable electric regulating means in said casing for accommodating said indicating means to the current passed, and an adjusting means in said casing for bringing said element in said casing to a desired position along the optical axis with respect to said divergent beam.

5. In apparatus for determining the transmittancy of translucent bodies, the combination comprising an optical system having an electric incandescent source of visible light provided with a concentrated filament radiating light with a substantially spherical wave front, means for insuring the substantial constancy of the electric current supplied to said filament, means for collecting light from said source and converting the same into a beam of parallel light, means for submitting translucent bodies one at a time to examination by said beam, refracting means for converting the beam transmitted by said translucent body into a divergent beam, an electric system having a photoelectric element positioned in said divergent beam, current indicating means associated with said photoelectric element for indicating the current passed in response to the photoelectric effect, and adjusting means for positioning said element at various points along the optical axis in a desired portion of said divergent beam.

RALPH H. MÜLLER.